(12) United States Patent  
Cornog et al.

(10) Patent No.: US 7,587,062 B2  
(45) Date of Patent: Sep. 8, 2009

(54) WATERMARKING

(75) Inventors: Katherine H. Cornog, Newburyport, MA (US); Mitrajit Dutta, Durham, NH (US)

(73) Assignees: Avid Technology, Inc., Tewksbury, MA (US); University of New Hampshire, Durham, NH (US)

( * ) Notice: Subject to any disclaimer, the term of this patent is extended or adjusted under 35 U.S.C. 154(b) by 900 days.

(21) Appl. No.: 10/841,142

(22) Filed: May 7, 2004

(65) Prior Publication Data

US 2005/0002543 A1     Jan. 6, 2005

Related U.S. Application Data

(60) Provisional application No. 60/469,616, filed on May 9, 2003.

(51) Int. Cl.  
*G06K 9/00* (2006.01)  
*H04L 9/32* (2006.01)

(52) U.S. Cl. .................... 382/100; 713/176

(58) Field of Classification Search .............. 382/100; 713/176; 380/210  
See application file for complete search history.

(56) References Cited

U.S. PATENT DOCUMENTS 5,170,440 A     12/1992     Cox (Continued)

FOREIGN PATENT DOCUMENTS

WO     WO 99/63443     12/1999

OTHER PUBLICATIONS

Kwok, Sai Ho., *Watermark-Based Copyright Protection System Security*, Communications Of The ACM, Vo. 46, No. 10, Oct. 2003, pp. 98-101.

(Continued)

*Primary Examiner*—John B Strege  
(74) *Attorney, Agent, or Firm*—Peter J. Gordon; Fish & Richardson; Oliver Strimpel

(57) ABSTRACT

A structured watermark may be embedded in data by applying an irregular mapping of variations defined by the structured watermark to frequency domain values representing the data. In particular, the frequency domain representation of the data comprises an ordered set of frequency domain values. The structured watermark is used to define an ordered set of variations to be applied to the frequency domain values. Each variation is a value defined by the structured watermark. An irregular mapping from positions in the ordered set of variations to positions in the ordered set of frequency domain values is defined. This irregular mapping is one-to-one and invertible. Application of the irregular mapping to the set of variations results in a set of values that may appear to be noise both in the frequency domain and in the signal domain of the data. The signal domain of the data may be n-dimensional, and may be a spatial, temporal or other domain from which data may be converted to the frequency domain. The signal domain of the data may be continuous or discrete. Each frequency domain value is modified by the variation mapped to the position of the frequency domain value by the irregular mapping. A frequency domain value may be modified using an additive or multiplicative operation. Using additive embedding, the modifications to the frequency domain values may be effected in the signal domain without computing the frequency domain values of the data by transforming, to the signal domain, the results of applying the irregular mapping to the set of variations. The watermark may be detected in target data by using the inverse of the irregular mapping on the frequency domain representation of the target data. Because the watermark is structured, it may be perceptible in the target data after the target data is processed by the inverse of the irregular mapping. A similarity metric, such as correlation, also can be used to detect the presence of the structured watermark in the processed target data.

23 Claims, 5 Drawing Sheets

U.S. PATENT DOCUMENTS

| | | | |
|---|---|---|---|
| 5,359,362 A | 10/1994 | Lewis et al. | |
| 5,363,305 A | 11/1994 | Cox et al. | |
| 5,383,013 A | 1/1995 | Cox | |
| 5,644,651 A | 7/1997 | Cox et al. | |
| 5,696,964 A | 12/1997 | Cox et al. | |
| 5,727,080 A | 3/1998 | Cox et al. | |
| 5,734,592 A | 3/1998 | Cox et al. | |
| 5,751,838 A | 5/1998 | Cox et al. | |
| 5,774,576 A | 6/1998 | Cox et al. | |
| 5,848,155 A | 12/1998 | Cox | |
| 5,915,027 A | 6/1999 | Cox et al. | |
| 5,930,369 A | 7/1999 | Cox et al. | |
| 5,991,426 A | 11/1999 | Cox et al. | |
| 6,064,738 A | 5/2000 | Fridrich | |
| 6,069,914 A | 5/2000 | Cox | |
| 6,078,688 A | 6/2000 | Cox et al. | |
| 6,108,434 A | 8/2000 | Cox et al. | |
| 6,154,571 A | 11/2000 | Cox et al. | |
| 6,208,735 B1 | 3/2001 | Cox et al. | |
| 6,278,792 B1 | 8/2001 | Cox et al. | |
| 6,282,300 B1 | 8/2001 | Bloom et al. | |
| 6,332,194 B1 | 12/2001 | Bloom et al. | |
| 6,496,591 B1 * | 12/2002 | Rhoads | 382/100 |
| 6,983,057 B1 * | 1/2006 | Ho et al. | 382/100 |
| 2002/0080993 A1 * | 6/2002 | Rhoads | 382/100 |
| 2003/0026422 A1 | 2/2003 | Gerheim et al. | |
| 2003/0221106 A1 * | 11/2003 | Delp et al. | 713/176 |

OTHER PUBLICATIONS

Matheson, Lesley R., et al., *Robustness and Security of Digital Watermarks*. In H. Imai and Y. Zheng, editors, Financial Cryptography, IFC '98, vol. 1465 of Lecture Notes in Computer Science, pp. 227-240. Springer, Feb. 1998.

Voyatzis, G., et al., *Chaotic Watermarks for Embedding in the Spatial Digital Image Domain*, in Proc. of ICIP '98, Oct. 1998, Chicago, Illinois, vol. 2, pp. 432-436.

* cited by examiner

WATERMARKING

CROSS-REFERENCE TO RELATED APPLICATIONS

This application is a non-provisional application that claims the benefit of, and priority to, under 35 U.S.C. §119(e), provisional patent application 60/469,616, filed on May 9, 2003, which is hereby incorporated by reference.

BACKGROUND

Watermarking involves embedding information in data so that the information is hidden in the normal use of that data. Ideally, the information is embedded so that 1) it does not significantly reduce data quality, 2) the information can be recovered and 3) it is robust both to malicious attacks and nonmalicious attacks such as typical processing operations that may be performed on the data. Thus, watermarking involves a trade-off among data quality, robustness and capacity of information carried by the watermark.

Nonmalicious attacks include a variety of operations performed on the data that have a side effect of weakening the strength of the watermark signal with respect to the the data. For example, if the data is image data, that data may be, for example, compressed, resized, cropped, converted between analog and digital format, or sub sampled.

Malicious attacks include a variety of attacks designed to weaken the strength of the signal relating to the watermark embedded in the data, which in turn reduces the ability to detect the watermark. For example, a common malicious attack on several identical images with different watermarks is to average them together to produce a new, identical image with the strength of the watermarks significantly reduced. Some operations may be considered both malicious and non-malicious attacks.

For example, a common activity in the piracy of motion pictures is capturing a movie displayed in a movie theatre using a camcorder. The movie then is transferred to a computer and distributed. Thus, any watermark embedded in an image of the motion picture is subjected to several operations that affect the watermark: conversion to film, projection on a screen, capture on a camcorder, and probably digitizing and compression. All of these operations have the effect of reducing the strength of the watermark in the motion picture and thus are kinds of attacks.

SUMMARY

A structured watermark may be embedded in data by applying an irregular mapping of variations defined by the structured watermark to frequency domain values representing the data. In particular, the frequency domain representation of the data comprises an ordered set of frequency domain values. The structured watermark is used to define an ordered set of variations to be applied to the frequency domain values. Each variation is a value defined by the structured watermark. An irregular mapping from positions in the ordered set of variations to positions in the ordered set of frequency domain values is defined. This irregular mapping is one-to-one and invertible. Application of the irregular mapping to the set of variations results in a set of values that may appear to be noise both in the frequency domain and in the signal domain of the data. The signal domain of the data may be n-dimensional, and may be a spatial, temporal or other domain from which data may be converted to the frequency domain. The signal domain of the data may be continuous or discrete. Each frequency domain value is modified by the variation mapped to the position of the frequency domain value by the irregular mapping. A frequency domain value may be modified using an additive or multiplicative operation. Using additive embedding, the modifications to the frequency domain values may be effected in the signal domain without computing the frequency domain values of the data by transforming, to the signal domain, the results of applying the irregular mapping to the set of variations.

By using such an irregular mapping, a structured watermark is less likely to be perceptible when it is embedded in data. However, the watermark may be detected in target data by using the inverse of the irregular mapping on the frequency domain representation of the target data. Because the watermark is structured, it may be perceptible in the target data after the target data is processed by the inverse of the irregular mapping. A similarity metric, such as correlation, also can be used to detect the presence of the structured watermark in the processed target data.

As an example, the structured watermark may represent a multi-bit message to be embedded in data. In this case, the frequency domain values may be divided into a number of nonoverlapping subsets corresponding to a number of bits of the multi-bit message. The positions of the frequency domain values that are elements of each subset are selected to have an irregular distribution within the ordered frequency domain representation of the data. Each bit is associated with a different subset of the frequency domain values and defines a variation to be applied to the values in its associated subset. This association between each bit and the positions of each frequency domain value in each subset of frequency domain values is an irregular mapping. In each subset of the frequency domain values, the values in that subset are modified according the variation defined by the bit associated with that subset.

For image data, one way to define subsets of frequency domain values is to create a watermark image having fewer, or the same number of, pixels as there are frequency domain values. The watermark image is divided into a plurality of equally sized regions, each associated with a bit of the information. The pixels in each region are set to a binary value corresponding to the bit associated with the region. The binary value may be differentially encoded. An example differential encoding is to represent the value 0 with the ordered pair (1,−1) and the value 1 with the ordered pair (−1,1). In other words, one half of the subset of values may be altered using one value (e.g., 1) whereas the other half of the subset of values may be altered using the negative of that value (e.g., −1). Such differential encoding of each bit ensures that the average value of all of the frequency domain values remains unchanged by these alterations, which improves the ability to detect the watermark. As another example for image data, the structured watermark may be a watermark image that includes a logo or other image data. Each pixel represents a variation to be used to modify a corresponding frequency domain value of the data. A watermark image is reordered using an irregular mapping. For example, such an irregular mapping may be achieved by mixing the watermark image several times using a chaotic map, such as a discrete Baker's map. The mixed watermark image appears to be noise, but the original watermark image can be extracted by mixing the mixed watermark image using the inverse of the discrete Baker's map. As a result of this mixing, each pixel in the mixed image is associated with a frequency domain value and a bit of information.

The irregular mapping also may include the application of a key-dependent permutation function to permute the ordered set of variations defined by the structured watermark. When using the application of a chaotic map as part of the irregular mapping, this permutation is performed before the application of the chaotic map during embedding, and after the application of the inverse chaotic map during detection. Parameters for the application of the chaotic map may be combined with parameters that define a permutation to define an input to a key generation function. The key generating function produces a watermark key for encoding and detecting the watermark. For example, the key generating function may be a one-dimensional chaotic map.

Using these techniques, multiple watermarks may be embedded in the same data. Also, multiple encoders may embed the same watermark in different instantiations of the same data using different keys. Also, an encoder may embed different watermarks in different instantiations of the same data using the same key or using different keys.

To detect a structured watermark embedded in target data, the target data is first preprocessed to align the samples of the target data with those of the original data. Such alignment is performed generally in two ways. First, if the original data is available, various operations may be performed to conform the target data to the original data. For example, for an image, the target data may be warped to align objects in the target data with objects in the original data. Second, if the original data is unavailable, information about the image, such as the size of the image, may be communicated by a key and used to align the target data. Any other information available about the original data also may be used. If the original data is available, it also may be subtracted from the target data. This preprocessed data is converted to the frequency domain. The frequency domain values are then reordered using the inverse of the irregular mapping from the positions in the set of variations to the positions in the set of frequency domain values. The watermark then can be detected in the reordered frequency domain values of the processed target data. Detection may be performed by a human recognizing or perceiving the structure of the watermark. If the watermark is known, or can be regenerated from other information, detection may be performed by measuring similarity between the watermark and the reordered frequency domain values of the processed target data. This measure of similarity is then compared to a threshold. Simple measures of similarity include linear and normalized correlation.

If the data that is watermarked is image data, preprocessing involves ensuring that the target data has the same dimensions as, and is aligned with, the original data. Such preprocessing may involve operations such as resizing, warping, translating or otherwise modifying the target image.

Different aspects of the invention include apparatus, methods and computer program products for encoding images using such watermarking, and for decoding images using such watermarking, as well as digital information products including watermarked images.

DETAILED DESCRIPTION

Figure 1:
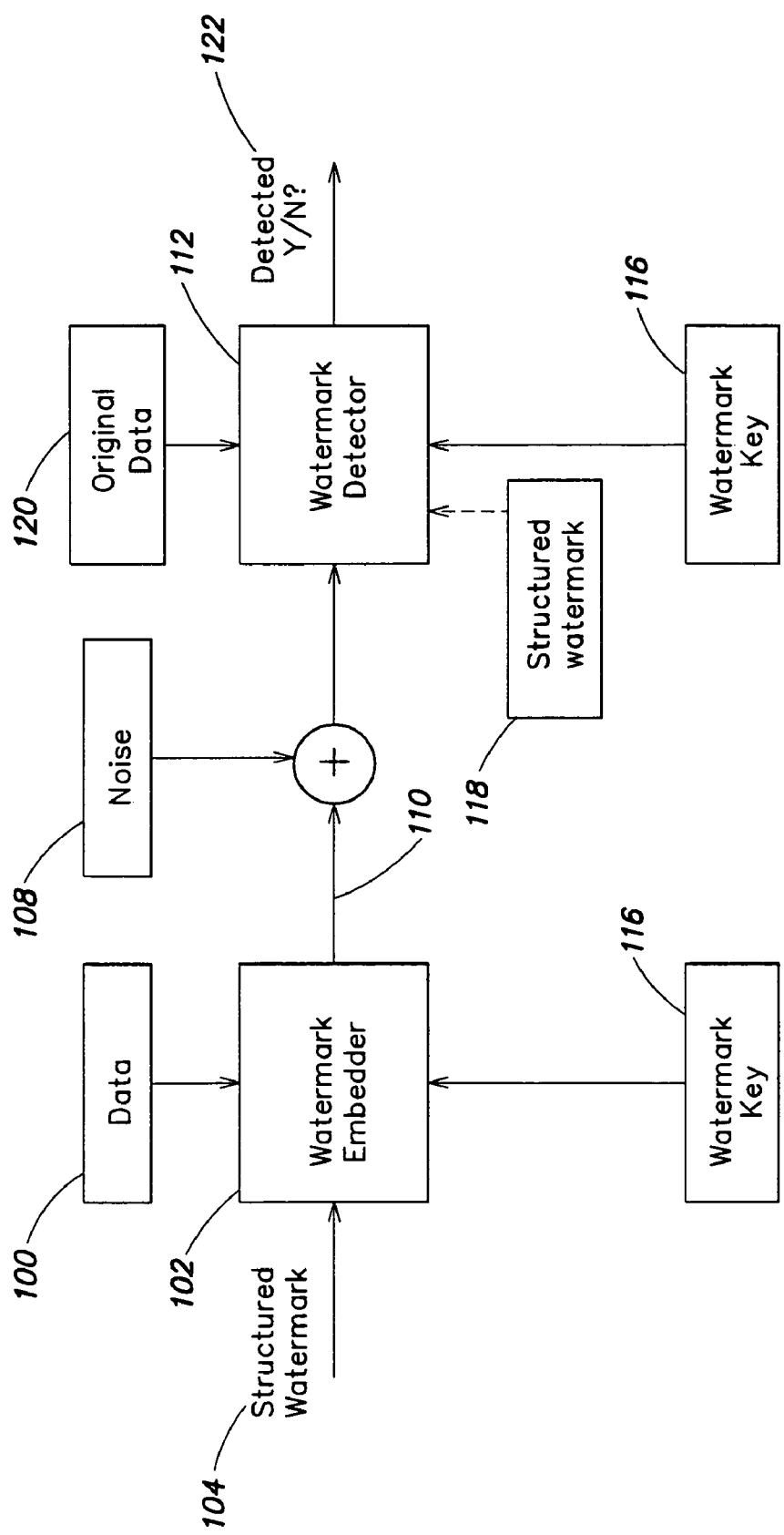
FIG. 1 is a block diagram of an example system for embedding and detecting a structured watermark in data such as an image.

Referring to FIG. 1, a block diagram of a system for embedding and detecting a structured watermark in data, such as an image, is shown. A structured watermark is any data that has perceptible structure. The data 100 is input to a watermark embedder 102. The structured watermark 104 to be embedded in the data 100 also is input to the watermark embedder 102. The structured watermark 104 defines an ordered set of variations which are used by the watermark embedder 102 to modify the data 100, thus embedding the structured watermark in the data. To embed the structured watermark in the data, an irregular mapping of positions in the ordered set of variations to positions in an ordered set of frequency domain values representing the data is applied. An irregular mapping, when applied to a structured watermark, results in data that has no apparent structure. Each frequency domain value is modified by the variation mapped to the position of the frequency domain value by the irregular mapping. The watermark encoder uses a watermark key 116 in the encoding process. The watermark key represents the parameters and other data to be used by the watermark embedder 102 to modify the data, and in turn is used by a detector (described below) to detect the structured watermark. Such parameters and other data include, but are not limited to, information about the original data, information describing how to generate the irregular mapping and information describing how to generate the structured watermark. The key may be used to generate the structured watermark that is input to the watermark embedder.

The data with the embedded watermark is transmitted over a communication channel 110, which will introduce noise, as indicated at 108, into the data in the form of malicious and nonmalicious attacks. The communication channel may take any of a variety of forms and includes virtually any medium, or combination of media, on which information may be transmitted or stored, whether transiently or permanently.

A watermark detector 112 receives data from the communications channel and attempts to detect whether the embedded watermark is present in the received data. To detect the watermark, the watermark detector receives the watermark key 116 used by the watermark embedder 102, so that it may generate the irregular mapping and the structured watermark. The watermark detector optionally may receive the structured watermark 118 instead of generating it from the watermark key. The original data 120, if available, also may be used. The watermark detector 112 processes the received data to place it in a form to permit comparison with the structured watermark. The watermark detector 112 may compare the processed data to the structured watermark using a similarity metric. The measure of similarity is compared to a threshold to provide a detector output 122 indicative of whether the structured watermark was detected.

Figure 2:
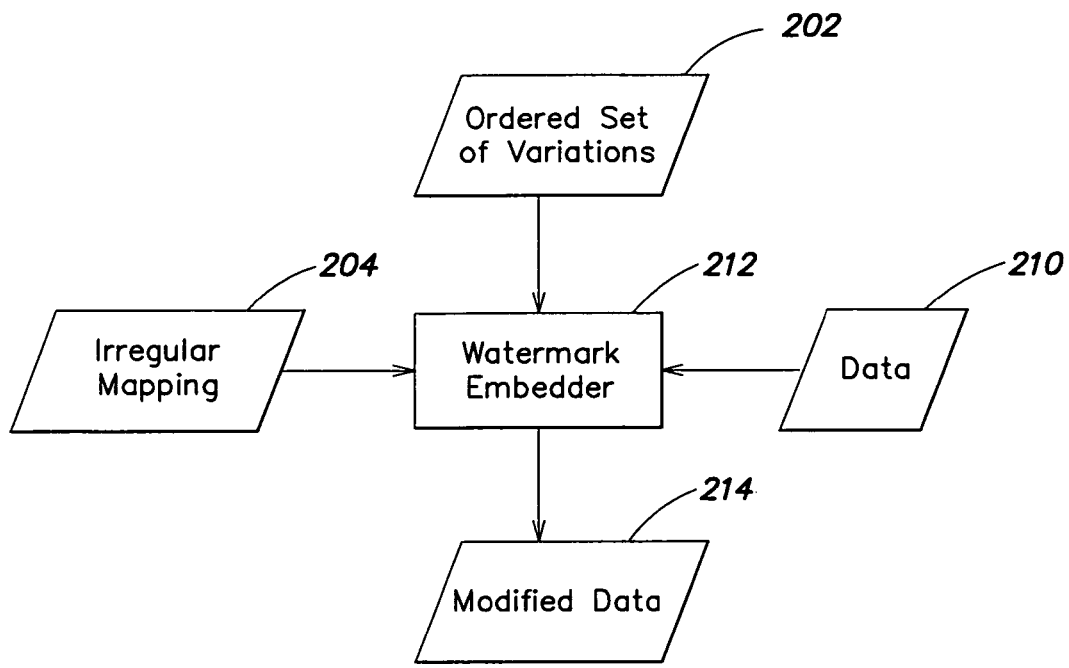
FIG. 2 is a data flow diagram of an example system that embeds a structured watermark in frequency domain values of data.

Referring now to FIG. 2, an example watermark embedder will be described in more detail. To embed a structured watermark in data, a format for a frequency domain representation of the data is used. Embedding the structured watermark may be effected in a signal domain representation of the data, in which case the actual frequency domain representation of the data need not be computed. The format of the frequency domain representation of the data includes the positions, in an ordered set, of the frequency domain values that represent the data. This format generally is defined by convention according to the transform used to generate the frequency domain representation.

The structured watermark defines an ordered set 202 of variations to be applied to the frequency domain values. Each variation is a value defined by the structured watermark. An irregular mapping 204 from positions in the ordered set of variations to positions in the ordered set of frequency domain values is defined. This irregular mapping is one-to-one and invertible. Application of the irregular mapping to the set of variations results in a set of data that may appear to be noise both in the frequency domain and in the signal domain. Each frequency domain value of the data 210 is modified, by the watermark embedder 212, by the variation mapped to the position of the frequency domain value using the irregular mapping. The modified data 214 thus includes the watermark.

A frequency domain value may be modified using an additive or multiplicative operation, which is thus a function of the frequency domain value, the variation to be applied to the frequency domain value and any weighting parameter (herein called an embedding strength). Using additive embedding, such modifications may be computed by the watermark embedder in the signal domain without computing the frequency domain values for the data. In particular, the set of variations may be mapped, using the irregular mapping, to positions corresponding to their frequency domain values. The result of this mapping can be inversely transformed into corresponding signal domain variations that can be added to the data to embed the watermark.

Figure 3:
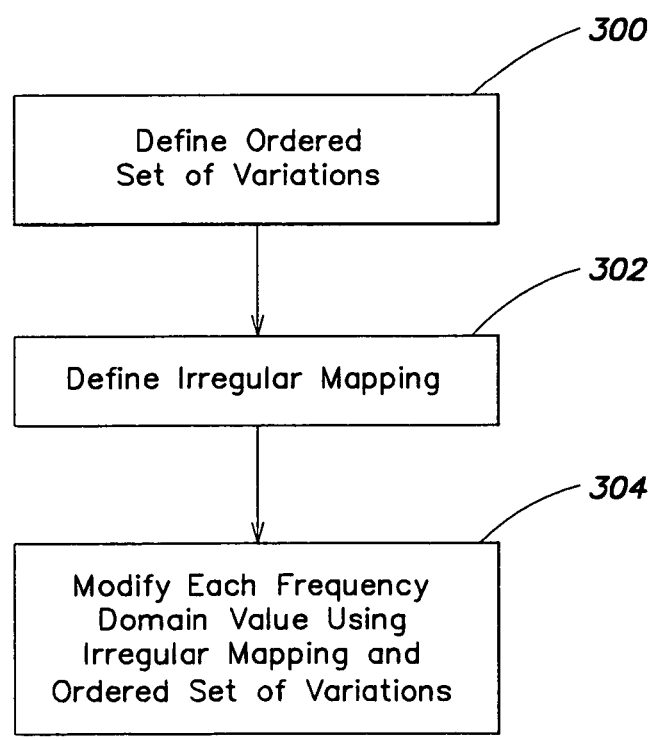
FIG. 3 is a flow chart describing an example process for embedding a structured watermark in frequency domain values of data.

A flowchart describing operation of a system described by FIG. 2 is provided in FIG. 3. The ordered set of variations to be applied to the frequency domain values is received (300). Each variation is a value defined by the structured watermark. An irregular mapping from positions in the ordered set of variations to positions in the ordered set of frequency domain values also is defined (302). The irregular mapping may be derived using a watermark key. It is presumed that the positions of frequency domain values in the ordered set of frequency domain values for the data are known. Each frequency domain value is modified (304) according to the variation mapped to the position of the frequency domain value in the ordered set of frequency domain values. This modification may be effected either in the signal domain representation or in the frequency domain representation of the data.

As an example, the structured watermark may represent a multi-bit message to be embedded in data. In this case, the frequency domain values may be divided into a number of nonoverlapping subsets corresponding to a number of bits of the multi-bit message. The positions of the frequency domain values that are elements of each subset are selected to have an irregular distribution within the ordered frequency domain representation of the data. Each bit is associated with a different subset of the frequency domain values and defines a variation to be applied to the values in its associated subset. This association between each bit and the positions of each frequency domain value in each subset of frequency domain values is an irregular mapping. In each subset of the frequency domain values, the values in that subset are modified according the variation defined by the bit associated with that subset.

Examples of this kind of watermarking will now be described in connection with image data.

Image data has a frequency domain representation that typically includes a DC value and a set of frequency domain values, commonly called coefficients. A common operation that is used to obtain a frequency domain representation of an image is called a discrete cosine transform. In the examples below, a discrete cosine transform is applied to an entire image to provide the frequency domain values. Alternatively, a discrete cosine transform may be applied separately to different blocks of pixels within the image. Other transforms, including, but not limited to, Fourier transforms and Laplace transform, also may be used. When represented in a computer, the set of frequency domain values typically is ordered according to a convention commonly used for that kind of transform.

A structured watermark that may be applied to frequency domain values for an image also is two-dimensional, and thus is referred to herein as a watermark image. The watermark image has a size that is the same as or smaller than the size of the frequency domain representation. Each pixel represents a variation to be applied to a corresponding frequency domain value. The frequency domain value that corresponds to a pixel in the watermark image depends on the irregular mapping that is used.

Figure 6:
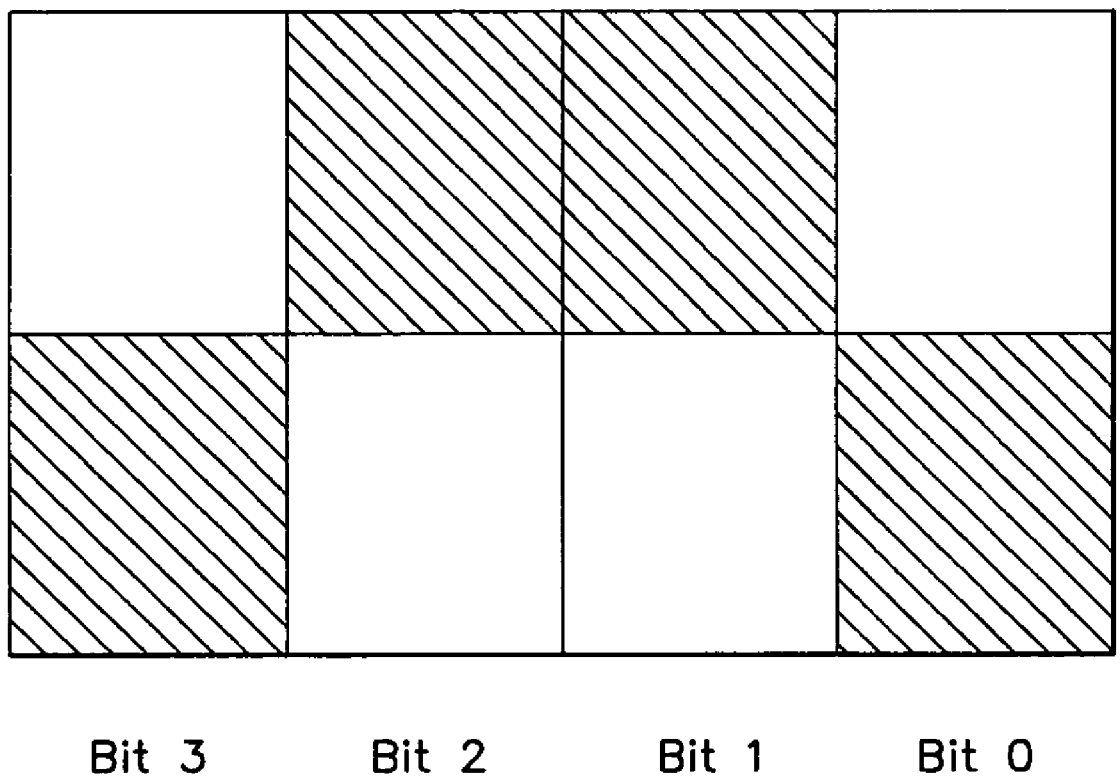
FIG. 6 is a diagram of an example structured watermark image that defines a differentially encoded multi-bit message.

For example, a watermark image may represent an encoding of a multi-bit message as an image. In this case, the watermark image is divided into a number of equally sized regions corresponding to a number of subsets of frequency domain values (and the number of bits of the message). Each region of the watermark image includes a plurality of pixels and is associated with a bit of the message. As long as all of the regions contain the same number of pixels, their shape and location is not important. Each pixel in each region has a value corresponding to the bit of the message that is associated with the region. Each bit of the message may be encoded differentially. Such an image is shown in FIG. 6. In particular, within a region, such as indicated by "Bit3," one half of the pixels may take on a value, such as +1 (shown shaded), and the other half of the pixels take on the negative of that value, such as −1 (shown blank), depending on the value of the bit to be encoded. For example, to represent a bit with a value '1', the first half of a region is set to a '+1' and the second half of the region is set to a '−1'. To represent a bit with a value '0', the first half of a region is set of a '−1' and the second half of the region is set to a '+1'. Such differential encoding ensures that the watermark image has a zero mean and fixed norm.

By using differential encoding of a binary image with a zero mean, when using additive embedding, the embedded watermark does not affect the distribution of the frequency domain values. In particular, the mean of the data with the watermark is the same as the mean of that data without the watermark. However, the distribution of the frequency domain values in each half of each region associated with a bit of a message is shifted. In particular, the mean of each half of each region is shifted by +/− the embedding strength. This property of the watermarked image may be used to detect the watermark.

The watermark image also may be a logo or other image which may have some structure. The watermark image may be an image with a few grey scales. Each pixel represents a variation to be applied to corresponding frequency domain values. Such a watermark image may be normalized, by subtracting its mean value and scaling its range, to create a watermark image with zero mean and a fixed norm.

An irregular mapping between positions of values in the watermark image and positions of frequency domain values in the frequency domain representation of an image may be provided by using a discrete implementation of a chaotic map. In particular, a chaotic map is applied to the watermark image several times in an iterative process. Each iteration rearranges the location of the pixels of the watermark image. After some number of iterations the pixels in the watermark image becomes redistributed, and the resulting image may appear to be noise both in the signal domain and in the frequency domain. The correspondence between pixels in the reordered watermark image and the frequency domain values provides the desired irregular mapping. If the watermark image encodes a multi-bit message, application of the chaotic map results in an irregular distribution of each bit of the message throughout the frequency domain values.

A map is chaotic if it is extremely sensitive to initial conditions and the trajectories of the pixels for each iteration of the map are bounded. A chaotic map suitable for generating an irregular mapping for watermarking data has a discrete implementation, is invertible, is area preserving and has long orbits for most data positions. A suitable chaotic map, when applied for several iterations, should result in a set of data that may appear to be noise both in the frequency domain and in the signal domain.

Generally, a chaotic map is area preserving if the determinant of the Jacobian matrix of the map is 1. For chaos to occur, a value called the Lyapunov number that characterizes the map must be greater than one. This value represents the sensitivity of the map to initial conditions.

A discrete implementation of a chaotic map is area preserving, when applied to a watermark image, under two conditions. First, the trajectory for each pixel remains in the space defined by the original watermark image. Second, no two pixels are mapped to the same location.

The orbit length is the number of iterations of the map required to map data back to its original position. For a discrete implementation of a chaotic map applied to a watermark image, the orbit length is the number of iterations of the map after which a pixel returns to its original position. To be suitable for use in generating an irregular mapping for a watermark image, the chaotic map should be selected to have long orbits for most of the pixel locations in the watermark image. For example, for a 720×480 image, orbits of a few thousand or more are preferable.

A chaotic map that meets these conditions for two-dimensional data is known as a Baker's map, which is a two-dimensional chaotic map that has a continuous definition provided by the Equation 1.

Equation 1:

$$\begin{bmatrix} x' \\ y' \end{bmatrix} = \begin{bmatrix} \lambda_a & 0 \\ 0 & \alpha^{-1} \end{bmatrix} \begin{bmatrix} x \\ y \end{bmatrix} \quad y \leq \alpha$$

$$\begin{bmatrix} x' \\ y' \end{bmatrix} = \begin{bmatrix} \lambda_b & 0 \\ 0 & \beta^{-1} \end{bmatrix} \begin{bmatrix} x \\ y \end{bmatrix} + \begin{bmatrix} 1-\lambda_b \\ \frac{-\alpha}{\beta} \end{bmatrix} \quad y > \alpha$$

$$\beta = 1 - \alpha, \lambda_a + \lambda_b \leq 1, x \in [0, 1], y \in [0, 1]$$

This continuous definition has four parameters, $\alpha$, $\beta$, $\lambda_\alpha$ and $\lambda_\beta$, each of which is a constant, and is selected so that the map meets the criteria described above.

A suitable chaotic map for mixing a watermark image (for image dimensions that are multiples of 2 but not powers of 2) is a discrete implementation of this Baker's map will all parameters set to 0.5. A discrete implementation of a forward Baker's map is provided by Equation 2.

Equation 2:

$$\begin{bmatrix} x' \\ y' \end{bmatrix} = \begin{bmatrix} \lfloor 0.5x \rfloor \\ 2y + \mod(x, 2) \end{bmatrix} \quad y \leq P/2$$

$$\begin{bmatrix} x' \\ y' \end{bmatrix} = \begin{bmatrix} \lfloor 0.5x \rfloor \\ 2y + \mod(x, 2) \end{bmatrix} + \begin{bmatrix} Q/2 \\ -P \end{bmatrix} \quad y > P/2$$

$$x \in [0, Q-1], y \in [0, P-1]$$

A discrete implementation of the corresponding inverse Baker's map is provided by Equation 3.

Equation 3:

$$\begin{bmatrix} x \\ y \end{bmatrix} = \begin{bmatrix} 2x' + \mod(y', 2) \\ \lfloor 0.5y' \rfloor \end{bmatrix} \quad x' < Q/2,$$

$$\begin{bmatrix} x \\ y \end{bmatrix} = \begin{bmatrix} 2x' + \mod(y', 2) \\ \lfloor 0.5y' \rfloor \end{bmatrix} + \begin{bmatrix} -Q \\ P/2 \end{bmatrix} \quad x' \geq Q/2$$

$$x' \in [0, Q-1], y' \in [0, P-1]$$

In each of equations 2 and 3, P and Q represent the image size. All of the parameter values $\alpha$, $\beta$, $\lambda_\alpha$ and $\lambda_\beta$, in this example are constants that are equal to 0.5. This discrete implementation of the Baker's map avoids fractional pixel locations by twisting local neighborhoods of 1×2 pixels into 2×1 pixels.

The number of iterations for which this discrete Baker's map is applied can be any number high enough to cause the watermark image to appear to have lost its perceptible structure. For most natural images, the number of iterations is typically greater than 20 to 25. The number of iterations could be selected randomly from a range of values, for example, 30 to 100.

Other area preserving discrete maps with long orbits also may be used. For example, the following Equation 4 (forward map) and Equation 5 (inverse map) also are a form of discrete map, where n is an integer and P and Q are multiples of n. Using these Equations with small values of n, such as 2, 3, 4 and 5, provide results that are comparable to the discrete Baker's map described above.

Equation 4:
for $i = 0 \ldots (n-1)$ $$\begin{bmatrix} x' \\ y' \end{bmatrix} = \begin{bmatrix} \lfloor x/n \rfloor \\ ny + \mod(x, n) \end{bmatrix} + \begin{bmatrix} i*Q/n \\ -P \end{bmatrix} \quad (i+1)*P/n > y \geq i*P/n$$

$$x \in [0, Q-1], y \in [0, P-1]$$

Equation 5:
for $i = 0 \ldots (n-1)$ $$\begin{bmatrix} x \\ y \end{bmatrix} = \begin{bmatrix} nx' + \mod(y', n) \\ \lfloor y'/n \rfloor \end{bmatrix} + \begin{bmatrix} -Q \\ i*P/n \end{bmatrix} \quad (i+1)*Q/n > x' \geq i*Q/n$$

$$x' \in [0, Q-1], y' \in [0, P-1]$$

Using a watermark image and a chaotic map to encode the information to be embedded in the data, the watermark key would include the number of iterations of the map that are applied to the watermark image and the size and position of the area that is mixed. The number of bits to be encoded by the watermark image and size of the watermark image also may be used as keys to permit regeneration of the watermark image by a detector. This key ensures that each watermark may be detected only by someone having access to the key.

Because images mixed with different numbers of iterations of the discrete Baker's map are uncorrelated, multiple watermark images can be applied to the same image using different numbers of iterations of the discrete Baker's map.

The irregular mapping also may include the application of a key-dependent permutation function that permutes the watermark image before mixing by a chaotic map. For example, any function which divides the image into pieces (of which the size and location depends on the key) and rearranges those pieces may be used. For example, a stair-step function which divides strips of the image into top and bottom halves and interchanges them may be used. The watermark key also may include parameters defining this permutation function.

Given the relationship, by the irregular mapping, between variations and the frequency domain values to which they will be applied, the frequency domain values are modified. Thus the structured watermark is embedded in the frequency domain of the data. In particular, each frequency domain value is modified by a function of the variation associated with it and a parameter called an embedding strength. Embedding techniques generally are additive or multiplicative. For image data, each pixel of a mixed watermark image (as described above) is associated with a frequency domain value. Each frequency domain value this is altered according to the corresponding pixel in the mixed watermark image, weighted by the embedding strength.

Additive embedding of a watermark image in data involves applying a transform, such as a discrete cosine transform (DCT) to the data to obtain the frequency domain values, adding the weighted, mixed watermark image to the frequency domain values, and performing an inverse transform on the result. Alternatively, if the frequency domain values are obtained using a linear transform, such as the DCT, the inverse transform of the mixed watermark image may be weighted and added to the image in the signal domain. This latter technique requires less computation.

Multiplicative embedding modulates the embedding strength of the watermark by the magnitude of the frequency domain value of the data in which it is embedded. For example, a value from the mixed watermark image may be both weighted by the embedding strength and the absolute value of the frequency domain value which is to be altered. The result is then added to the frequency domain value.

The embedding strength parameter controls the peak signal-to-noise ratio (PSNR) of the resulting image. Thus, this parameter will vary depending on the data in which the watermark is to be embedded and the desired robustness of the mark. Thus, a suitable value for the embedding strength may be determined experimentally. For additive embedding of binary watermark images, such as described above, into the luminance channel of 8-bit YUV 720×486 natural images, an embedding strength of about 1.0 to 3.2 may provide about 35-50 dB PSNR.

Using these techniques, multiple watermarks may be embedded in the same data. Also, multiple encoders may embed the same watermark in different instantiations of the same data using different keys. Also, an encoder may embed different watermarks in different instantiations of the same data using the same key or using different keys.

Having now described how to embed a structured watermark in frequency domain values of data, detection of such a watermark in data will now be described. The data to be processed to detect the presence of a watermark is called, herein, the target data. Generally, one use of the detector is to determine whether the target data was derived from the original watermarked data to determine if illegal copying occurred.

Figure 4:
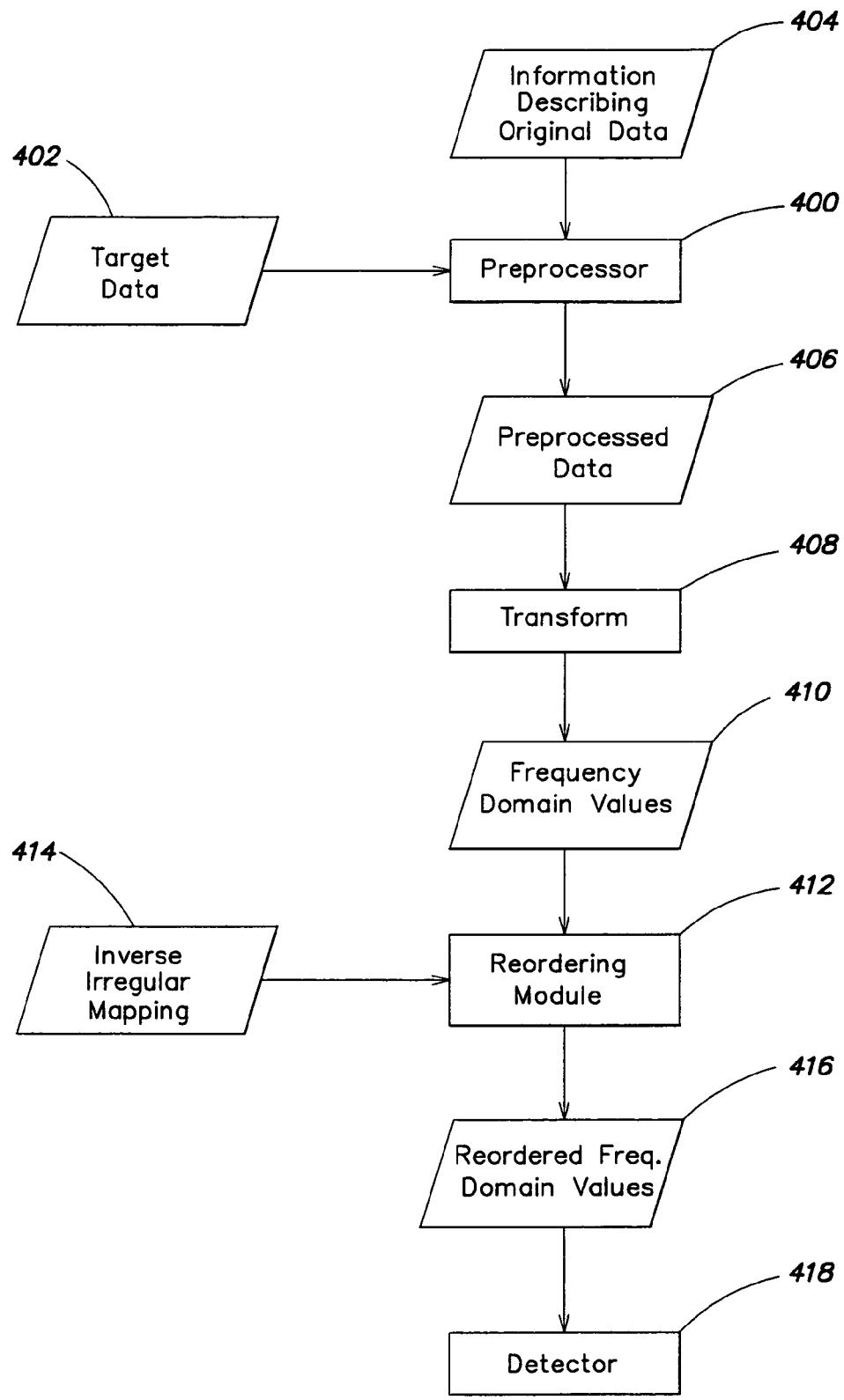
FIG. 4 is a data flow diagram of an example system that detects a structured watermark in frequency domain values of data.

In general, referring to FIG. 4, to detect a structured watermark embedded in target data, the target data 402 is first preprocessed by preprocessor 400 to align the samples of the target data with those of the original data. Thus the preprocessor 400 uses information 404 describing the original data, which may include the original data itself or some data, perhaps from the watermark key, that specifies the dimensions of the original data. If the original data is available, it may be used to perform the alignment and may be subtracted from the aligned target data. This preprocessed data 406 is converted to the frequency domain by a transform 408. The resulting frequency domain values 410 are then reordered by a reordering module 412. Reordering uses the inverse 414 of the irregular mapping from the positions in the set of variations to the positions in the set of frequency domain values, which may be provided by or derived from information in a watermark key. For example, if a chaotic map, such as a discrete Baker's Map, is used by the watermark embedder, the inverse of that discrete Baker's map is used to reorder the frequency domain values. If a key dependent permutation function was applied during encoding before iterations of the discrete Baker's map, the inverse of this permutation is applied after the iterations of the inverse discrete Baker's map. The watermark then can be detected in the reordered frequency domain values 416 of the processed target data. Detection may be performed by a human recognizing or perceiving the structure of the watermark in the reordered frequency domain values. If the watermark is known, or can be regenerated from other information such as through the watermark key, detection may be performed by a detector 418 that measures similarity between the watermark and the reordered frequency domain values of the processed target data. This measure of similarity is then compared to a threshold. Simple measures of similarity include linear and normalized correlation.

Figure 5:
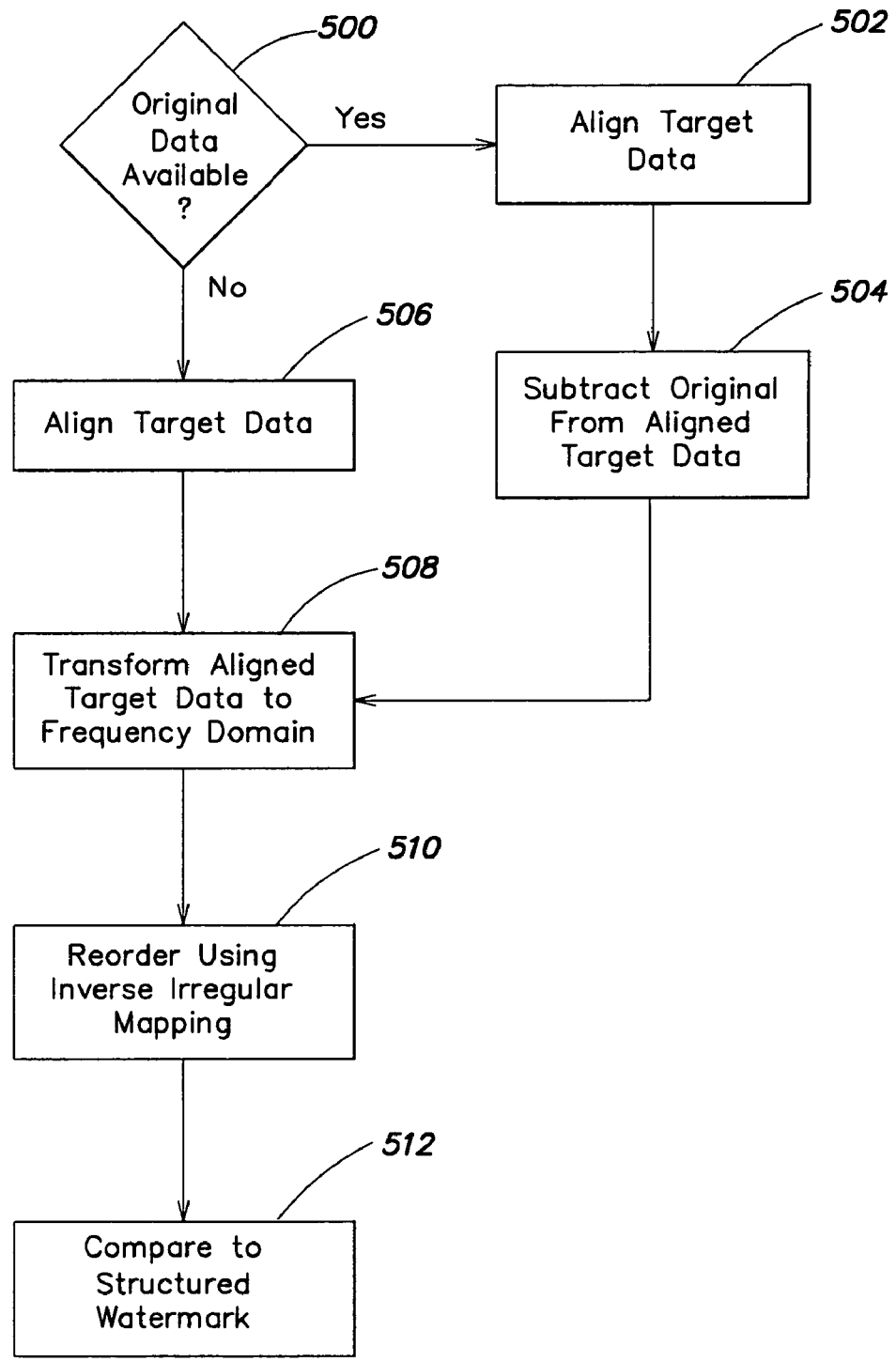
FIG. 5 is a flow chart describing an example process for detecting a structured watermark in frequency domain values of data.

A flow chart describing the operation of the detector described by FIG. 4 is provided in FIG. 5. If the original data is available (500), the original data is used to align the target data (502) with the original data. Next, the original data is subtracted (504) from the aligned target data. Otherwise, the target data is preprocessed (506) to align it with the dimensions of the original data based on available information describing the original data. The preprocessed target data is transformed (508) into frequency domain values. The frequency domain values are reordered (510) according to the inverse of the irregular mapping used when the watermark was embedded. The reordered data then may be compared (512) to the original structured watermark.

If the data that is watermarked is image data, preprocessing involves ensuring that the target data has the same dimensions as, and is aligned with, the original data. Such preprocessing may involve operations such as resizing, warping, translating or otherwise modifying the target image to provide such alignment.

An example detector for use with image data will now be described. This example is based on a watermark that encodes a multi-bit message differentially as a binary image such as in FIG. 6, and which is embedded using additive embedding. In this example, the frequency domain values are reordered by applying the inverse of the discrete Baker's map used to mix the watermark image, for the same number of iterations as used to embed the watermark image, and by applying the inverse of any key-dependent permutation applied to the watermark image. The mean of all of the frequency domain values also is subtracted from each of the frequency domain values. This reordering of and subtracting the mean from the frequency domain values produces an image that looks like the original watermark image with noise. In some cases, the original watermark image may be recognizable by the human eye in this image. Thus, presenting this image on a display may be sufficient to permit detection of the watermark. Alternatively, this image may be compared to the original watermark image by using a similarity metric. The following example describes a correlation detector for comparing this image to the original watermark image.

In this correlation detector, each of the reordered frequency domain values is compared to a threshold z. Only those coefficients below the threshold are kept for the rest of the analysis. A normalized correlation C may be computed between the reordered frequency domain values v having a magnitude below the threshold z and pixels in the watermark image w' having positions corresponding to the positions of those frequency domain values v having a magnitude below the threshold z. This normalized correlation C may be computed as the normalized sums of the magnitudes of the values $c_j$ produced for each of N regions of the watermark image, as represented by Equations 6 through 8, where M represents the number of values v for a region that are below this threshold z, where $r^+_j$ and $r^-_j$ signify the different halves of the region (due to the differential encoding) and where $\sigma_v$ is the standard deviation of the values v.

Equation 6: $\tilde{v} = \frac{v}{\|v\|} = \frac{v}{\sqrt{M}\,\sigma_v}, \tilde{w} = \frac{w'}{\|w'\|} = \frac{w'}{\sqrt{M}}$ Equation 7: $C = \tilde{v} \cdot \tilde{w} = \frac{v \cdot w'}{M\sigma_v} = \frac{1}{M\sigma_v}\sum_{j=1}^{N}|c_j| > T$ Equation 8: $c_j = v_j \cdot w'_j = \sum_{i \in r^+_j} v_{j,i} - \sum_{i \in r^-_j} v_{j,i}$ If the value C exceeds a threshold T, then the watermark is considered detected. If the watermark is considered detected, it is also possible to read each bit of the information in the watermark image by examining the sign of the value $b_j$ produced for the frequency domain values of each region that are less than z by Equation 9, where $M_1$ is the number of values v below z in $r^+_j$ and $M_2$ is the number of values v below z in $r^-_j$.

Equation 9: $b_j = v_j \cdot w'_j = \frac{1}{M_1}\sum_{i \in r^+_j} v_{j,i} - \frac{1}{M_2}\sum_{i \in r^-_j} v_{j,i}$ With the equations above, the detector uses thresholds z and T. These thresholds may be set experimentally. Also, in a computer program, these values may be adjustable by a user, for example through a graphical user interface device, such as a slider or input box.

The values of z and T also may be set automatically in an image adaptive manner as follows. The detector output C is computed for each value z in the set of z values. An example set of z values is the sequence [2, 3, 4, 6, 8, 12, 16, 24, 32, 48, 64, 96, 128, 192, 256, 384, 512]. A threshold T may be selected for each value z in the set of z values, using the Neyman-Pearson criterion (which is described in Anthony D. Whalen, *Detection of Signals in Noise*, San Diego: Academic Press, Inc., 1971). If the computed detector output C is greater than the selected threshold T for a contiguous sub-range of the set of threshold values z, a value for the threshold z is selected for which the difference between the computed detector output C and the threshold T is greatest. Each bit of the watermark may be detected using Equation 9 and the selected threshold z.

The various components of the system described herein may be implemented in a variety of forms. For example, a watermark embedder may be implemented in digital hardware, such as in a field programmable gate array or an embedded system with a microprocessor. Such an implementation may be used, for example, in a camera, a digital cinema projector, or other electronic equipment used to capture, generate or reproduce data, to watermark data input to or output by that equipment. The system also may be implemented as a computer program using a general-purpose computer system. Such a computer system typically includes a main unit connected to both an output device that displays information to a user and an input device that receives input from a user. The main unit generally includes a processor connected to a memory system via an interconnection mechanism. The input device and output device also are connected to the processor and memory system via the interconnection mechanism.

One or more output devices may be connected to the computer system. Example output devices include, but are not limited to, a cathode ray tube display, liquid crystal displays and other video output devices, printers, communication devices such as a modem, and storage devices such as disk or tape. One or more input devices may be connected to the computer system. Example input devices include, but are not limited to, a keyboard, keypad, track ball, mouse, pen and tablet, communication device, and data input devices. The invention is not limited to the particular input or output devices used in combination with the computer system or to those described herein.

The computer system may be a general purpose computer system which is programmable using a computer programming language. The computer system may also be specially programmed, special purpose hardware. In a general-purpose computer system, the processor is typically a commercially available processor. The general-purpose computer also typically has an operating system, which controls the execution of other computer programs and provides scheduling, debugging, input/output control, accounting, compilation, storage assignment, data management and memory management, and communication control and related services.

A memory system typically includes a computer readable medium. The medium may be volatile or nonvolatile, writeable or nonwriteable, and/or rewriteable or not rewriteable. A memory system stores data typically in binary form. Such data may define an application program to be executed by the microprocessor, or information stored on the disk to be processed by the application program. The invention is not limited to a particular memory system.

A system such as described herein may be implemented in software or hardware or firmware, or a combination of the three. The various elements of the system, either individually or in combination may be implemented as one or more computer program products in which computer program instructions are stored on a computer readable medium for processing by a computer. Various steps of a process may be performed by a computer processing such computer program instructions. The computer system may be a multiprocessor computer system or may include multiple computers connected over a computer network. The components shown in FIGS. 2 and 4 may be separate modules of a computer program, or may be separate computer programs, which may be operable on separate computers. The data produced by these components may be stored in a memory system or transmitted between computer systems.

Having now described an example embodiment, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention.

What is claimed is:

1. A method for embedding a structured watermark into data, defined by a plurality of samples, wherein the data has a format for a frequency domain representation of the data comprising an ordered set of a plurality of frequency domain values, the method comprising:
defining, in a memory device, an ordered set of variations to be applied to the frequency domain values, wherein each variation has a value defined by the structured watermark;
defining, in a memory device, an irregular mapping from positions in the ordered set of variations to positions in the ordered set of frequency domain values, wherein the irregular mapping is independent of the frequency domain values; and
using a processor connected to the memory device, modifying, without overwriting, each frequency domain value by the variation mapped by the irregular mapping to the position of the frequency domain value in the ordered set of frequency domain values.

2. The method of claim 1 wherein applying the irregular mapping to the set of variations results in a set of data that appears to be noise both in the frequency domain and in the signal domain.

3. The method of claim 1, wherein defining the ordered set of variations comprises creating a watermark image, wherein the watermark image includes a number of pixels corresponding to at least some of the frequency domain values for the data and wherein each pixel represents a variation.

4. The method of claim 3, further comprising permuting the watermark image according to a key dependent permutation function.

5. The method of claim 3, wherein the irregular mapping is provided by mixing the watermark image using a discrete implementation of a chaotic map.

6. The method of claim 5, wherein the chaotic map is a Baker's map.

7. The method of claim 6, further comprising permuting the watermark image according to a key dependent permutation function before mixing the watermark image.

8. The method of claim 5, further comprising permuting the watermark image according to a key dependent permutation function before mixing the watermark image.

9. The method of claim 1, wherein the irregular mapping is provided by mixing the ordered set of variations using a discrete implementation of a chaotic map.

10. The method of claim 9, wherein the data is two-dimensional data and the ordered set of variations is two-dimensional data, and the chaotic map is a Baker's map.

11. The method of claim 3 wherein the watermark image has a number of equally sized, nonoverlapping regions, wherein each region includes a plurality of pixels and is associated with a variation to be applied to the frequency domain values, and wherein each pixel in each region has a value corresponding to the variation associated with the region, wherein the variation associated with a region represents a bit of information.

12. The method of claim 11, wherein each variation represents a bit of information that is encoded differentially in the watermark image.

13. The method of claim 3, wherein the watermark image has zero mean and a fixed norm.

14. The method of claim 3, wherein creating the watermark image comprises normalizing the watermark image.

15. The method of claim 14, wherein normalizing the watermark image comprises:
subtracting an average value of the watermark image from the watermark image; and
scaling a range of the watermark image.

16. The method of claim 1, wherein modifying each frequency domain value comprises:
applying a transform to the data to create the frequency domain values;
modifying each frequency domain value according to the variation associated with the frequency domain value by the irregular mapping; and
applying an inverse transform to the modified frequency domain values.

17. The method of claim 1, wherein modifying each frequency domain value comprises:
applying the irregular mapping to the ordered set of variations;
applying an inverse transform to the mapped set of variations to create a signal domain representation of the mapped set of variations; and
modifying the data according to the signal domain representation of the mapped set of variations.

18. The method of claim 1, wherein defining the irregular mapping comprises:
associating each bit of the information with a corresponding subset of the frequency domain values, wherein the frequency domain values are divided into a number of disjoint subsets corresponding to the number of bits defining the information, wherein positions of the frequency domain values that are elements of each subset have an irregular distribution within the frequency domain representation of the data; and
in each subset, modifying the frequency domain values of the subset according to the bit of the information associated with the subset.

19. A computer program product, comprising:
a computer readable medium;
computer program instructions on the computer readable medium that, when processed by a computer, instruct the computer to perform a process for embedding a structured watermark into data, defined by a plurality of samples, wherein the data has a format for a frequency domain representation of the data comprising an ordered set of a plurality of frequency domain values, the process comprising:
defining an ordered set of variations to be applied to the frequency domain values, wherein each variation has a value defined by the structured watermark;
defining an irregular mapping from positions in the ordered set of variations to positions in the ordered set of frequency domain values, wherein the irregular mapping is independent of the frequency domain values; and
modifying, without overwriting, each frequency domain value by the variation mapped using the irregular mapping to the position of the frequency domain value in the ordered set of frequency domain values.

20. A system for embedding a structured watermark into data, defined by a plurality of samples, wherein the data has a format for a frequency domain representation of the data comprising an ordered set of a plurality of frequency domain values, comprising:

means for providing an ordered set of variations to be applied to the frequency domain values, wherein each variation has a value defined by the structured watermark;

means for providing an irregular mapping from positions in the ordered set of variations to positions in the ordered set of frequency domain values, wherein the irregular mapping is independent of the frequency domain values; and means for altering, without overwriting, each frequency domain value by the variation mapped using the irregular mapping to the position of the frequency domain value in the ordered set of frequency domain values.

21. Apparatus for embedding a structured watermark into data, defined by a plurality of samples, wherein the data has a format for a frequency domain representation of the data comprising an ordered set of a plurality of frequency domain values, comprising:

an input for receiving an ordered set of variations to be applied to the frequency domain values, wherein each variation has a value defined by the structured watermark and an irregular mapping from positions in the ordered set of variations to positions in the ordered set of frequency domain values, wherein the irregular mapping is independent of the frequency domain values; and a processor that accesses the ordered set of variations and the irregular mapping and provides an output including the data with the structured watermark embedded therein, by modifying, without overwriting, each frequency domain value of the data by the variation mapped using the irregular mapping to the position of the frequency domain value in the ordered set of frequency domain values.

22. An information product, comprising:

a tangible computer-readable medium;

a data structure encoded on the tangible computer-readable medium that, when processed by the computer, is used by the computer as watermarked data that includes a structured watermark embedded in data, wherein the data has a format for a frequency domain representation comprising an ordered set of a plurality of frequency domain values, and wherein the structured watermark defines an ordered set of variations having an irregular mapping from positions in the ordered set of variations to positions in the ordered set of frequency domain values, wherein the irregular mapping is independent of the frequency domain values, and wherein each frequency domain value of the data has been modified, without being overwritten, by the variation mapped using the irregular mapping to the position of the frequency domain value in the ordered set of frequency domain values.

23. A method for embedding a structured watermark into data, defined by a plurality of samples, wherein the data has a format for a frequency domain representation of the data comprising an ordered set of a plurality of frequency domain values, the method comprising:

defining, in a memory device, an ordered set of variations to be applied to the frequency domain values, wherein each variation has a value defined by the structured watermark;

defining, in a memory device, an irregular mapping from positions in the ordered set of variations to positions in the ordered set of frequency domain values, wherein the irregular mapping is a one-to-one mapping between the positions in the ordered set of variations to positions in the ordered set of frequency domain values; and using a processor connected to the memory device, modifying each frequency domain value according to an arithmetic function of the frequency domain value and the variation mapped by the irregular mapping to the position of the frequency domain value in the ordered set of frequency domain values.

* * * * *